United States Patent [19]
Sellers et al.

[11] Patent Number: 5,720,431
[45] Date of Patent: Feb. 24, 1998

[54] COOLED BLADES FOR A GAS TURBINE ENGINE

[75] Inventors: Robert R. Sellers, Palm Beach Gardens; Friedrich O. Soechting, Tequesta; Frank W. Huber; Thomas A. Auxier, both of Palm Beach Gardens, all of Fla.

[73] Assignee: United Technologies Corporation, Hartford, Conn.

[21] Appl. No.: 236,092

[22] Filed: Aug. 24, 1988

[51] Int. Cl.[6] ........................................ F01D 5/18
[52] U.S. Cl. ................. 416/97 R; 416/96 A; 416/97 A; 416/92
[58] Field of Search ........................ 416/92, 96 A, 416/97 R, 97 A

[56] References Cited

U.S. PATENT DOCUMENTS

| | | | |
|---|---|---|---|
| 3,240,468 | 3/1966 | Watts et al. | 416/97 A X |
| 3,533,711 | 10/1970 | Kercher | 416/97 R |
| 3,810,711 | 5/1974 | Emmerson et al. | 416/97 A |
| 3,885,886 | 5/1975 | Richter | 416/97 R |
| 3,994,622 | 11/1976 | Schultz et al. | 416/96 A X |
| 4,073,599 | 2/1978 | Allen et al. | 416/97 R |
| 4,118,146 | 10/1978 | Dierberger | 416/97 A |
| 4,171,184 | 10/1979 | Lings et al. | 416/96 A X |
| 4,180,373 | 12/1979 | Moore et al. | 416/97 R |
| 4,221,539 | 9/1980 | Corrigan | 416/97 A |
| 4,321,010 | 3/1982 | Wilkinson et al. | 416/96 A X |
| 4,424,001 | 1/1984 | North et al. | 416/97 R X |
| 4,753,575 | 6/1988 | Levengood et al. | 415/115 X |
| 4,761,116 | 8/1988 | Braddy et al. | 416/92 |

FOREIGN PATENT DOCUMENTS

| | | | |
|---|---|---|---|
| 104506 | 8/1980 | Japan | 416/97 R |
| 231102 | 12/1984 | Japan | 416/97 R |
| 149503 | 7/1986 | Japan | 416/97 R |
| 1299904 | 12/1972 | United Kingdom | 416/96 A |
| 2093923 | 9/1982 | United Kingdom | 416/97 R |

*Primary Examiner*—Everette A. Powell, Jr.
*Assistant Examiner*—Christopher K. Montgomery
*Attorney, Agent, or Firm*—Norman Friedland

[57] ABSTRACT

An internally air cooled turbine blade for a gas turbine engine of the type including a trailing edge section, leading edge section and mid chord section wherein each section includes a straight through radial passage communicating cooling air from the root to the tip of the blade, and the radial passages (feed channels) on the pressure side and suction side supply the cooling air to the film cooling holes in the airfoil surface and the radial passage (feed chamber) in the mid chord section replenishes the feed channels with cooling air through replenishment cooling holes interconnecting the feed channels and feed chamber. The rotation of the blade imparts a centrifugal pumping action to the air within the feed chamber for maximizing the cooling effectiveness of the cooling air. The air discharging at the tip cools the tip of the blade and provides tip aerodynamic sealing and the leading edge and trailing edge are similarly fed cooling air.

7 Claims, 1 Drawing Sheet

COOLED BLADES FOR A GAS TURBINE ENGINE

CROSS REFERENCE TO RELATED APPLICATIONS

The subject matter of this application is related to the subject matter of commonly owned U.S. patent applications Ser. Nos. 07/236,093 and 07/236,094 (Attorney Docket Nos. F-5979 and F-6057) filed on even date herewith and entitled "Cooled Blades for a Gas Turbine Engine" and "Clearance Control for the Turbine of a Gas Turbine Engine", now pending, and patent No. 5,667,359, respectively.

1. Technical Field

This invention relates to gas turbine engines and particularly to internally cooled rotor blades.

2. Background Art As is well known, the aircraft engine industry is experiencing a significant effort to improve the gas turbine engine's performance while simultaneously decreasing its weight. Obviously, the ultimate goal is to attain the optimum thrust-to-weight ratio that is available. Of course, one of the primary areas of concentration is the "hot section" of the engine since it is well known that engine's thrust/weight ratio is significantly improved by increasing the temperature of the turbine gases. However, turbine gas temperature is limited by the metal temperature constraints of the engine's components. Significant effort has, to date, been made in achieving higher turbine operating temperatures by adapting significant technological advances in the internal cooling of the turbine blades. Examples of a few of the many accomplishments in this area are exemplified in U.S. Pat. Nos. 3,533,711 granted to D. M. Kercher on Oct. 13, 1966, 4,073,599 granted to Allen et al on Feb. 14, 1978, and 4,180,373 granted to Moore et al on Dec. 25, 1979, which latter patent is assigned to the same assignee as this patent application. All of these prior art internal cooling techniques include an effective convective cooling scheme by including serpentine passages in the airfoil section of the blade. Another technique worthy of mention is the impingement tube which is inserted into the cavity of the hollow turbine blade.

But, by and large, the most prevalent cooling techniques employed in current aircraft engine turbine blades are those exemplified by the aforementioned patents. Typically, these techniques utilize three cooling circuits, namely, the leading edge (LE), midchord (MC) and trailing edge (TE).

In the LE circuit air enters in the supply cavity, impinges on the LE, and exits through film cooling holes. In the MC circuit air enters the supply cavities, serpentines forward through a three pass nested serpentine, and exits as film cooling air. In the TE circuit air enters through a supply cavity and is metered by axial impingement (usually single or double impingement) before it exits at the blade TE. Notwithstanding the intensive industry-wide effort in optimizing the cooling effectiveness of turbine blades, current state-of-the-art blades still suffer self-evident disadvantages. For example, film cooling which is ideal for applying a sheath of cooling air around the exterior surface of the airfoil is not optimized since the pressure ratio across the film producing holes is less than optimum for all such holes. The pressure drop through the blade is not optimized since a significant pressure drop is evidenced by the sharp turning of the cooling air around corners in the serpentine passages. And, the overall blade chord length at the tip is not optimized, because the area necessary for the cooling air to turn in the serpentine passages restricts the minimum size of the tip section. Obviously, the overall tip chord length of the blade also impacts the weight of the blade, the size and weight of the disk supporting the blade, and the forces generated by the rotational effects of the blade (blade pull).

We have found that we can obviate the disadvantages alluded to in the above by providing a double wall blade configuration, where the space between the walls defines a radial passage or film hole feed channel adjacent the pressure surface, suction surface, leading edge and trailing edge for radially flowing cool air being supplied thereto from a cooling air source. A central radially extending feed chamber is likewise supplied with cooling air from said source and interconnects the feed channel by a plurality of radially extending holes in the inner wall, and each of these holes is sized to optimize the pressure ratio across the film cooling holes.

According to the present invention, the blade central feed chamber and the blade feed channel supply film cooling axial airflow to the outer blade wall providing optimum film cooling effectiveness and provides a conduit for radial airflow to the tip of the blade generating maximum internal convection. The radial airflow to the tip effectively provides aerodynamic sealing between the tip of the blade and its attendant outer air seal or shroud. This can be understood by recognizing that the radial internal passages in the rotating blade behave as a centrifugal pump. As the cooling air is being discharged through the film cooling holes and at the blade tip and the feed channel becomes depleted of cool air, this channel is continuously being replenished with cooling air from the central feed chamber. Since the air in this central feed chamber is being centrifuged, the pressure therein becomes progressively higher as the air proceeds radially outward toward the tip. Since the feed channel feeding axial flow to the film cooling holes and radial flow to the blade tip is progressively diminishing feed channel pressure due to higher radial flow resistance than the central feed chamber as it proceeds to the tip, this arrangement takes advantage of the natural consequence of this pumping feature to generate a delta pressure across the rib that separates the central feed chamber and the feed channel to replenish the feed cavity airflow as required. Hence, proper feed channel flow resistance and proper sizing of the supply holes allows the film hole pressure ratio to be controlled for optimum film cooling effectiveness, maximized internal convection and aerodynamic tip sealing.

The air from the central feed chamber serves multi functions. Not only does it serve to replenish the air in the feed channel feeding the film cooling holes, it also supplies radial flow on the inner surface of the airfoil's outer wall for maximized convection and it supplies tip flow for tip aerodynamic sealing. Hence, the air from the supply holes is discretely located and oriented so that the air enters the feed channel as required.

DISCLOSURE OF THE INVENTION

An object of this invention is to provide an improved internally air cooled turbine blade for a gas turbine engine.

A feature of this invention is to provide an improved turbine blade for a gas turbine engine that includes radial film air cooling feed channel(s) that is replenished with cooling air from a radially extending feed chamber centrally disposed in the airfoil by supplying cooling air through radially spaced holes interconnecting the feed channel with the feed chamber.

A feature of this invention is an improved internally cooled turbine blade that eliminates the serpentine passages.

A feature of this invention is to provide a double wall constructed turbine blade wherein the space between the airfoil shell and the adjacent wall defines a feed channel continuously receiving air at the root for feeding film cooled holes in the shell and wherein the adjacent wall defines a radial extending cavity also continuously receiving air at the root for replenishing air into the feed channel through holes radially spaced in the adjacent wall.

The foregoing and other features and advantages of the present invention will become more apparent from the following description and accompanying drawings.

BEST MODE FOR CARRYING OUT THE INVENTION

This invention is particularly efficacious for turbine blades of a gas turbine engine where internal cooling of the blades is desired. The construction of internally cooled turbine blades is well described in the literature and, for the sake of convenience and simplicity, only that portion of the blade will be described herein that is necessary for an understanding of the invention. For details of gas turbine engines and turbine blades, reference should be made to the F100 and JT9D engines manufactured by Pratt & Whitney Aircraft, a division of United Technologies Corporation, the assignee of this patent application and the patents mentioned above.

Figure 1:
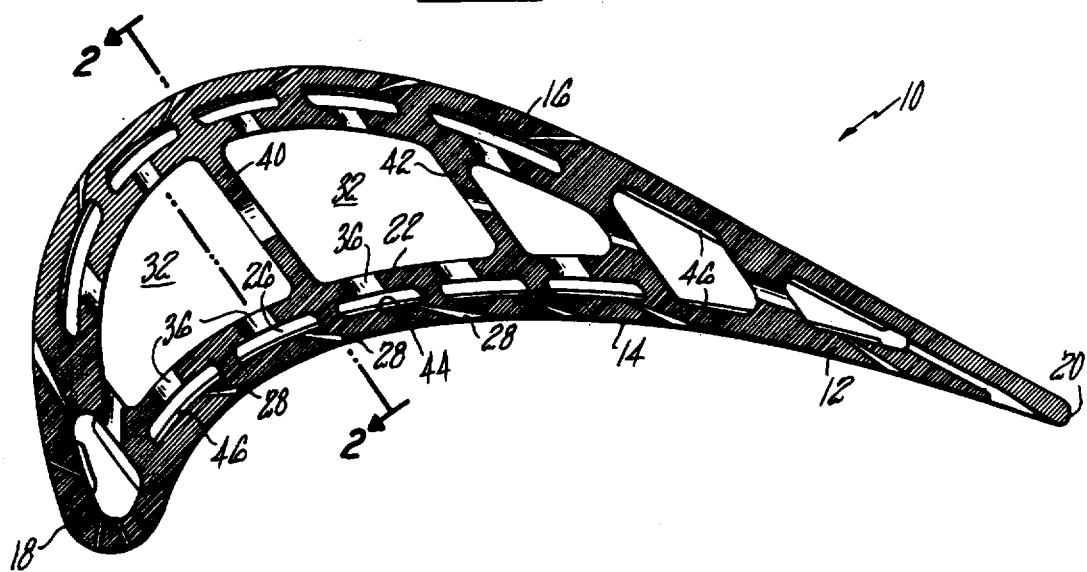
FIG. 1 is a sectional view of a turbine blade taken along a chordwise axis illustrating this invention.
Figure 2:
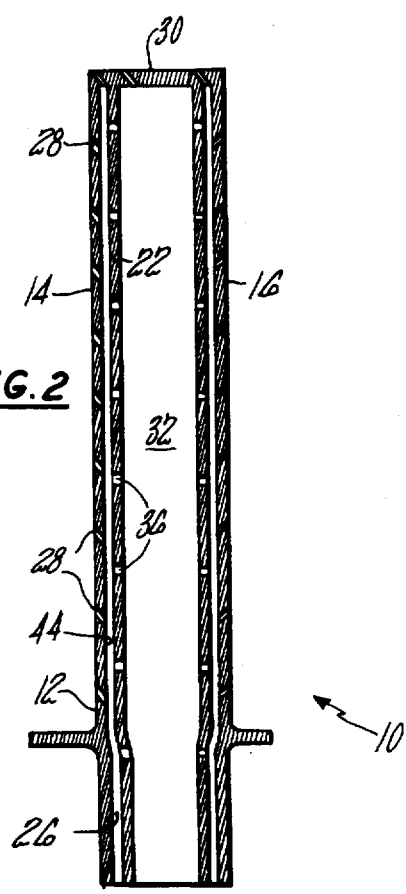
FIG. 2 is a sectional view taken along lines 2—2 of FIG. 1.

As can be seen in FIG. 1, which is a cross-sectional view taken along the chordwise axis, and FIG. 2, the blade, generally illustrated by reference numeral 10, comprises an outer wall or shell 12 defining a pressure surface 14, a suction surface 16, a leading edge 18 and trailing edge 20. The blade 10 is cast into a double wall configuration wherein the inner wall 22 is generally coextensive and parallel to the outer shell 12 but is spaced therefrom to define a radially extending passage 26. Since this passage 26 feeds cooling air to the film cooling holes 28 and to the blade tip 30, passage 26 is referred to as the feed channel. While feed channel 26 is shown as a plurality of feed channels, the number of such passages will be predicated on the particular application. This is a dynamic rather than static passage since cool air is constantly flowing inasmuch as it is continuously being fed cooling air and continuously discharging film cooling air. This is best seen in FIG. 2 showing schematically that cool air enters the bottom of feed channel 26 and flows radially toward the tip 30 of the blade.

Cooling air is also continuously flowing to the central cavity, which is a radially extending passage 32. As will be apparent from the description to follow, inasmuch as this cavity feeds cooling air to feed channel 26 to replenish the supply of cooling air as it is being exhausted through the film cool holes 28, it is hereinafter referred to as the feed chamber 32.

It is contemplated that feed channel 26 and feed chamber 32 will receive compressor air as is typical in these designs.

It is apparent from the foregoing as the cooling air in the feed channel 26 progresses radially from the root toward the tip of the blade and feeds the radially spaced film holes 28, the cooling air becomes depleted. However, since feed channel 26 is always in communication with feed chamber 32 by the radially spaced holes 36, the supply of cooling air is continuously being replenished. Obviously, the cooling air in feed channel 26 and feed chambers 32 is being pressurized as it progresses toward the tip of the blade by virtue of the rotation of the blade. Because of this inherent feature, the film cooling holes in proximity to the tip of the blade are in a position to receive cooling air at an acceptable pressure level.

The feed chamber 32 is generally a hollow cavity extending from the root to the tip and is bounded by the inner wall 22. Ribs such as ribs 40 and 42 may be incorporated to provide structural integrity to the blade. The use of ribs, of course, will be predicated on the particular design of the blade and its application.

Because holes 36 serve to replenish cooling air in feed channel 26, they are hereinafter referred to as replenishment cooling holes 36. Thus, the replenishment cooling holes serve, among other functions, means for replenishing the feed channel 26 and means for enhancing cooling effectiveness by maximized convective cooling and by introducing turbulence of the flow entering the film cooling holes. It has been found that replenishing the feed channels by the replenishment holes 36 has shown a significant improvement in the cooling effectiveness over a blade tested absent the replenishment cooling holes. The size of these holes may be selected to provide the desired pressure drop to achieve the desired pressure ratio across the film cooling holes.

Cooling may further be enhanced by incorporating trip strips 46 in feed channel 26. The trip strips serve an additional function besides the cooling aspect in that it creates a pressure drop feature. This may be desirable where the cooling air approaching the tip of the blade owing to the centrifuging of the air in the feed channel 26 and feed chamber 32 becomes over-pressurized and it is necessary to reduce this pressure to attain the pressure ratio necessary for optimizing the formation of the film egressing from the film cooling holes 28.

From the foregoing, it is apparent that the feed channel 26 and feed chamber 32 are straight through radial passages and eliminate the generally used serpentine passages. This feature allows the designer of the blade to reduce the tip size since it no longer has to accommodate the turning passages of the serpentine passage design and now allows the designer to apply aerodynamic tip sealing techniques. This permits the aerodynamic designer to select the blade tip chordal length at the minimum required by aerodynamic performance considerations without undue regard to internal cooling size demands. Of course, this feature carries with it several advantages that are desirable in turbine design. By taking advantage of this feature, the blade can be made lighter, it has a significantly reduced pull and the disk, supporting the blade, can be made lighter. All of these features favorably influence the weight, performance and life of the turbine.

Figure 3:
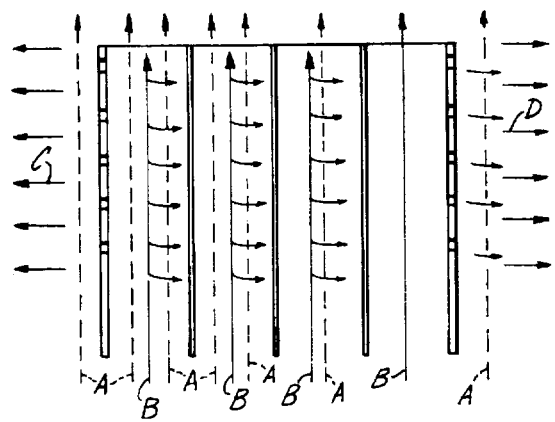
FIG. 3 is a flow circuit diagram illustrating the flow patterns internally of the turbine blade.

In operation and referring to the flow circuit in FIG. 3, cooling air enters the blade at the root section at the lower extremity of the blade and progresses through the airfoil section to the tip as illustrated by the dash arrow lines A and straight arrow lines B. Holes in the tip allow a portion of the air to be expelled in this location, a portion of the cooling air flows to the shower head at the LE and a portion of cooling air is directed to the TE as represented by the horizontal arrow lines C and D respectively.

As the air progresses radially outward toward the tip, the air in the feed chamber (arrow B) continuously replenishes the air in the feed channel (arrow A). Hence, the feed channel is constantly being supplied with cooling air. Because of the pumping action associated with the rotation of the blades, the pressure at the tip where it is most needed is inherently generated. This assures that the proper pressure ratio across the film holes is maintained along the entire surface of the shell.

Since the inner wall replaces the ribs that formed the serpentine passages, the inner wall serves as a heat transfer surface to provide the same heat convection feature that is attributed to the serpentine design.

As disclosed, this invention provides new techniques for the turbine designer that were never available to him heretofore. For example, the blades incorporating this invention can use a lower pressure source of cooling air to achieve the necessary cooling effectiveness. It provides means for reducing the blade chord size at the tip with its attendant advantages. Because of the replenishment feature, the amount of cooling air heatup due to convection can be optimized.

We have analytically found that the cooling effectiveness is improved over heretofore known turbine blades by a value approaching +30% which is equivalent to a reduction of blade average metal temperature of approximately 200° F. for a typical application. Also, a blade employing this invention has a potential of operating in an environment where the turbine inlet temperature can be increased by significant values, say 300° F. or higher, or alternatively the life of the blade can be greatly enhanced or blade costs can be significantly reduced by trading improved cooling effectiveness for cheaper materials. The use of this invention also lends itself to improved aerodynamics of the tip since the complexities posed by the turning requirements attendant serpentine passages is eliminated.

Figure 4:
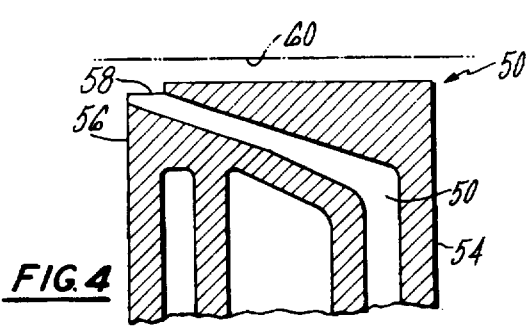
FIG. 4 is a partial view of the tip section of the turbine blade in section exemplifying a preferred embodiment.

FIG. 4 exemplifies a modified tip section of the turbine blade which is a preferred embodiment. The tip generally illustrated by reference numeral 50 routes the air in radial passage 52 adjacent the suction surface 54 to the tip of the blade adjacent the pressure surface 56. The passage 52 bends at the crossover point and is angled so that the airstream discharging at the tip through orifice 58 is at a predetermined angle that enhances the aerodynamic sealing efficacy between the tip and its attendant outer air seal or shroud 60 (only schematically illustrated).

The geometry of this blade also presents certain advantages with regard to manufacturing having the common practice of lost-wax casting. During the casting process all of the ceramic core elements, which form the internal cooling passages, extend through the airfoil root where they can be firmly gripped, to avoid core shift during casting. This geometry also lends itself to easy acid-leaching of the core material following casting.

Although this invention has been shown and described with respect to detailed embodiments thereof, it will be understood by those skilled in the art that various changes in form and detail thereof may be made without departing from the spirit and scope of the claimed invention.

We claim:

1. An axial flow turbine for a gas turbine engine which turbine is powered by engine working medium comprising a plurality of air cooled blades each of which have an airfoil surface exposed to said working medium defining a pressure side, suction side, root section, tip section, mid chord section having internal passages including at least one straight through radial passage defining a first feed channel adjacent said pressure side conducting cooling air from the root section to an opening in the tip section, a plurality of radially spaced film cooling holes in said airfoil surface being fed cool air from said feed channel, a second straight through radial passage defining a feed chamber in said mid chord section conducting cooling air from said root section to an orifice in said tip section, a plurality of radially spaced replenishment cooling holes communicating with said feed chamber for replenishing air in said feed channel whereby the rotation of said turbine centrifuges the air in said radial passages to increase the pressure of said cooling air as the air progresses toward said tip section of said blade.

2. An axial flow turbine as in claim 1 including another straight through radial passage adjacent said suction side defining a second feed channel having a plurality of radial spaced film cooling holes in said airfoil surface and a plurality of radially spaced replenishment cooling holes communicating cooling air from said feed chamber to said second feed channel.

3. An axial flow turbine for a gas turbine engine comprising a plurality of internally air cooled blades, each of said blades having an airfoil having an outer surface defining a pressure side, suction side, tip section, root section, leading edge and trailing edge, a generally contiguous but spaced wall means parallelly supported to the inner surface of said airfoil defining a plurality of straight through radial passageways having an inlet at the root section and an outlet at the tip section defining a feed channel, and each of said passageways having a plurality of radially spaced film cooling holes for delivering cooling air to form a film of cooling air over the pressure side and suction side, the inner surface of said spaced wall means defining an additional straight through radial passageway having an inlet at said root section and an outlet at said tip section defining a feed chamber, a plurality of radially spaced replenishment holes in said wall means communicating with said feed chamber for replenishing cooling air to said feed channels as the cooling air is depleted from said feed channels by said film cooling holes, and means for supplying cooling air to said root section, whereby the cooling air in said feed chamber is pressurized by the centrifugal action occasioned by the rotating blades and whereby the chordal length is minimized by the use of straight through radial passageways.

4. An axial flow turbine as claimed in claim 3 wherein said airfoil and wall means are integrally cast.

5. An axial flow turbine as claimed in claim 3 wherein said film cooling holes extend radially from said root section to said tip section.

6. An axial flow turbine as claimed in claim 3 wherein said replenishment cooling holes extend radially from said root section to said tip section.

7. An axial flow turbine as in claim 3 wherein said replenishment cooling holes are integrally cast in said wall means.

* * * * *